United States Patent
Husemann et al.

(10) Patent No.: US 6,753,079 B2
(45) Date of Patent: Jun. 22, 2004

(54) PROCESSING OF ACRYLIC HOTMELTS BY REACTIVE EXTRUSION

(75) Inventors: Marc Husemann, Hamburg (DE); Stephan Zöllner, Hamburg (DE)

(73) Assignee: Tesa AG, Hamburg (DE)

( * ) Notice: Subject to any disclaimer, the term of this patent is extended or adjusted under 35 U.S.C. 154(b) by 0 days.

(21) Appl. No.: 10/170,056

(22) Filed: Jun. 12, 2002

(65) Prior Publication Data

US 2003/0082370 A1 May 1, 2003

(30) Foreign Application Priority Data

Sep. 13, 2001 (DE) .......................... 101 45 229

(51) Int. Cl.$^7$ .............................. B32B 27/30
(52) U.S. Cl. ................ 428/355 AC; 525/285; 525/301; 525/303; 525/187; 525/124; 525/131
(58) Field of Search ............... 428/355 AC; 525/285, 525/301, 303, 187, 124, 131; 427/384; 522/149, 182, 184, 111, 112

(56) References Cited

U.S. PATENT DOCUMENTS

| | | | |
|---|---|---|---|
| 3,786,116 A | 1/1974 | Milkovick et al. | 260/885 |
| 3,832,423 A | 8/1974 | Milkovick et al. | 260/878 |
| 3,862,267 A | 1/1975 | Milkovick et al. | 260/878 |
| 4,234,662 A | 11/1980 | Pastor et al. | 428/500 |
| 4,693,776 A | 9/1987 | Krampe et al. | 156/327 |
| 4,696,776 A | 9/1987 | Hooker et al. | 264/46.4 |
| 4,994,322 A | 2/1991 | Delgado et al. | 428/343 |
| 5,276,069 A | 1/1994 | Rehmer et al. | 522/35 |
| 5,341,883 A | 8/1994 | Ringgenberg | 166/324 |
| 5,536,759 A | 7/1996 | Ramharack et al. | 522/35 |
| 5,614,586 A | 3/1997 | Tang et al. | 524/817 |
| 5,674,275 A | 10/1997 | Tang et al. | 607/152 |
| 5,741,543 A | 4/1998 | Winslow et al. | 427/208.4 |

FOREIGN PATENT DOCUMENTS

| | | | |
|---|---|---|---|
| EP | 0 458 164 A2 | 5/1991 | C08F/8/00 |
| EP | 0 608 981 B1 | 4/2002 | H04Q/11/04 |
| WO | WO 95/02003 | 1/1995 | C08F/290/04 |
| WO | WO 01/96413 A1 | 12/2001 | C08F/8/00 |

*Primary Examiner*—David J. Buttner
*Assistant Examiner*—Christopher Keehan
(74) *Attorney, Agent, or Firm*—Norris McLaughlin & Marcus PA

(57) ABSTRACT

A process for preparing polyacrylic hotmelt pressure sensitive adhesives, which comprises the following steps:

(a) compounding
an acrylic hotmelt pressure sensitive adhesive containing at least one functional group X, having a solvent content of not more than 0.5% by weight and a molecular mass $M_W$ of from 100,000 to 2,000,000 g/mol,
with at least one chemical substance R—Y containing at least one functional group Y, said at least one functional group X and said at least one functional group Y being chosen such that they are capable of undergoing a coupling reaction with one another, (b) treating the compound in a reactor with a mixing apparatus at a specific drive energy of not more than 0.09 kWh/kg and at a temperature of from 80 to 200° C., (c) transferring the self-adhesive composition thus treated to a downstream coating unit, and applying it from the melt to a backing material.

20 Claims, No Drawings

PROCESSING OF ACRYLIC HOTMELTS BY REACTIVE EXTRUSION

The invention relates to a process for preparing and for functionalizing polyacrylic hotmelt pressure sensitive adhesives and also to the use of such hotmelt pressure sensitive adhesives for adhesive tapes.

BACKGROUND OF THE INVENTION

Hotmelt pressure sensitive adhesives (hotmelt PSAs) are compounds which combine the properties of hotmelt adhesives with the properties of pressure sensitive adhesives. Hotmelt PSAs melt at elevated temperatures and cool to form a permanently tacky film which flows out adhesively on contact with a substrate. In combination with different substrates, such as paper, fabric, metal, and polymer films, for example, a large number of different products can be produced, particularly PSA tapes and also labels. These PSA products have a wide field of application in the automobile industry, for fastening or for sealing, for example, or in the pharmaceutical industry, for active substance patches, for example.

Processes for preparing such hotmelt PSAs (hotmelt processes) are therefore of growing importance industrially. Generally, environmental regulations and increasing costs are driving this development process. In addition to SIS (styrene/isoprene/styrene copolymer) systems, acrylic polymers are increasingly being applied from the melt as a polymer film to backing materials. For specialty applications, moreover, PSA tapes with very low outgassing characteristics are required. This can be ensured only by means of hotmelt processes, since conventional coatings applied from solution always still contain small fractions of residual solvent.

The typical coating temperature for hotmelt PSAs lies between 80 and 180° C. In order to minimize coating and processing temperatures, the molecular weight of the hotmelt PSA to be applied should be as low as possible. On the other hand, the PSA is also required to have a certain cohesion, so that the PSA tape will not slip from the substrate in use. In order to increase the cohesion, therefore, a high molecular weight is essential.

The properties of the parent PSAs can be modified by virtue of their chemical character. Accordingly, the properties can be influenced by changing the chemical structure of the polymer chains or else by admixing other components.

For the functionalization of PSAs, the prior art has a series of processes available.

For example, PSAs have been developed which possess a relatively low molecular weight but contain double bonds along the sidechains. These polymers, such as polyester acrylates or polyurethane acrylates, for example, can be efficiently crosslinked via the double bonds, using UV or ionizing radiation, and yet have only limited adhesive properties.

In the case of acrylic PSAs, polyfunctional acrylates or methacrylates are added beforehand in order to promote crosslinking; they increase the crosslinking reactivity and thus also raise the cohesion, but react only via a two-stage mechanism during irradiation (attachment to the polymer and then crosslinking via the remaining free acrylate double bond) and therefore exhibit poor crosslinking efficiency.

The principle of functionalizing double bonds by copolymerization cannot be applied to acrylic PSAs, since in this case the corresponding polyacrylates are prepared by free radical polymerization. All of the double bonds are reacted in the polymerization process, or instances of gelling occur during polymerization. One example of this was described by Pastor [U.S. Pat. No. 4,234,662 A], who used allyl acrylate or allyl methacrylate for the polymerization. A key problem resides, however, in the copolymerization of these compounds, which generally gel during the radical polymerization process. Moreover, owing to the relatively low reactivity of the allyl groups in respect of a crosslinking reaction, drastic experimental conditions are necessary: in particular, high temperatures or a long period of irradiation. For use as crosslinked PSAs, therefore, the allyl-modified acrylic polymers are not very suitable.

Another possibility of functionalization with double bonds is presented by polymer-analogous reactions. Generally speaking, polymer-analogous reactions can be conducted in solution or from the melt. EP 0 608 981 B1 likewise refers to the gelling problems with double bonds. This is supported by various further polymer-analogous reactions. For instance, polyacrylates containing carboxylic acid, hydroxyl, epoxy, and amine groups can be reacted polymer-anlogously with compounds containing double bonds; cf. U.S. Pat. No. 4,665,106 A. Owing to the low thermal stability of the components involved, however, this reaction could not be applied to hotmelts. Moreover, unfavorable process conditions resulted from the fact that large amounts of regulator had to be added to the polyacrylate in order to prevent gelling.

Consequently, for acrylic hotmelts, U.S. Pat. No. 5,536,759 A described the reaction of hydroxyl- or carboxyl-containing polyacrylates with 1-(1-isocyanato-1-methylethyl)-3-(1-methylethenyl) benzene (m-TMI) in solution with subsequent hotmelt workup. As a result of the functionalization with the double bonds, the polyacrylates described can be crosslinked very efficiently with UV light and so produce PSAs featuring high cohesion. Disadvantages of this process are the high toxicity of the isocyanates used and the complex two-stage process, since the polymerization is carried out in a first step and the polymer-analogous reaction has to be carried out in a second step in a reactor. Moreover, polyacrylates with double-bond functionalization lack thermal stability and are sensitive to shearing.

In the U.S. Pat. No. 5,741,543, polyacrylates functionalized with double bonds, prepared by a polymer-analogous reaction, are UV crosslinked. The polymers were prepared by the UV prepolymerization technique, which exhibits the known disadvantages such as slow process rates and the free traffic of monomers.

In the U.S. Pat. Nos. 3,786,116, 3,832,423, and 3,862,267, polyvinyl chloride or methacrylate esters are functionalized with polystyrene; however, these patents do not describe PSAs. In the U.S. Pat. No. 4,693,776, acrylate- or methacrylate-functionalized polystyrene was copolymerized with acrylic monomers and, in the form of PSA, were used in particular for bonds on human skin. These functionalized PSAs are, however, very difficult to prepare, since these macromonomers possess only low reactivity and can therefore be polymerized only to relatively low conversions. Likewise, these PSAs are difficult to concentrate, since unreacted residual monomers are removed again in the concentration process and thus sensitively disrupt the hotmelt process.

The U.S. Pat. No. 4,994,322 describes repositionable acrylic PSAs prepared again by copolymerization via acrylate- or methacrylate-functionalized polystyrene. These PSAs further comprise microspherical particles. The disadvantages attending U.S. Pat. No. 4,693,776 are present here as well.

In EP 0 707 604 A1, polyethylene/butene macromonomers are used for copolymerization with acrylates. This supports phases with a low glass transition temperature, which in turn allow the adhesives to flow on apolar surfaces, and thus ensure high bond strengths on PE and PP. A disadvantage is the poor conversion of the polymerization process described. Patents U.S. Pat. Nos. 5,614,586 and 5,674,275 describe tacky hydrogels which can be prepared from ethoxylated comonomers. The materials produced are repositionable but are not PSAs.

In contrast, the pros and cons of the individual processes are described [Chemie Ingenieur Technik (70), 1998, pp. 560–566]: "Polymer-analogous reactions in the melt make possible two processes which otherwise take place separately from one another. First of all, the reaction takes place; since the reaction medium is the melt, shaping by extrusion is able to be commenced even during the reaction. In this way, no additional reaction vessel nor any workup whatsoever are required. The absence of the solvent does, however, complicate the course of the reaction in a multiplicity of respects, for example, by the heterogeneity of the reaction mixture and the relatively slow diffusion of the reactants to one another."

Thus the process described in EP 0 608 981 B1 has the fundamental disadvantages of a polymer-analogous reaction in solution. What would be desirable, therefore, would be a process for acrylic PSAs which permits polymer-analogous reactions in the melt.

A key problem lies in the slow diffusion of the reactants. This problem can be solved only by raising the reaction temperatures, which improves the reactivity of the individual components to one another. For acrylic PSAs, however, this is subject to natural liimits.

For polymer-analogous reactions from the melt, therefore, the materials used are generally thermoplastics, which are processed and functionalized at high temperatures. For example, polystyrene-maleic anhydride thermoplastics are reacted at temperatures of from 180 to 200° C. [Chemie Ingenieur Technik (70), 1998, pp. 560–566 and Chemie Ingenieur Technik (71), 1999, pp. 1418–1421]. Additionally, polyesters are reacted with maleic anhydride in the melt [Journal of Polymer Science: Part A: Polymer Chemistry, Vol. 37, 1693–1702 (1999)]. Both processes are not, however, suitable for the functionalization for acrylic PSAs with double bonds. Journal of Polymer Science: Part A: Polymer Chemistry, Vol. 37, 1693–1702 (1999) performs a functionalization by radical grafting, but this cannot be used for functionalization with double bonds since the vinyl compounds would immediately be polymerized and so would no longer be available for subsequent crosslinking on the backing. The prior art uses polymers [Chemie Ingenieur Technik (70), 1998, pp. 560–566] which for PSAs have excessive glass transition temperatures, which if transferred to acrylic PSAs would exhibit excessive reaction temperatures (at the high temperatures employed, severe discoloration of the polymer already occurs, owing to reactions by, for example, thermally decomposing initiators which have remained after the polymerization process or by the decomposition of individual comonomers, such as tert-butyl acrylate, for example, at above 160° C.), and also possess very high fractions of copolymerized maleic anhydride, which places the glass transition temperature very high.

It is an object of the invention to provide a process for preparing pressure sensitive adhesives on an acrylic basis which exhibit viscoelastic behavior at room temperature and which do not exhibit the disadvantages of the prior art. Gelling of the pressure sensitive adhesives in the course of a hotmelt process ought to be prevented. The process ought to be suitable for providing, simply and elegantly a broad palette of hotmelt PSAs having different properties for a broad range of applications.

This object is achieved surprisingly and, for the skilled worker, unforeseeably by a process as represented in the main claim. The other claims relate to advantageous developments of this process, to the pressure sensitive adhesive thus prepared, and to one use of said adhesive.

SUMMARY OF THE INVENTION

The invention accordingly provides a process for preparing polyacrylic hotmelt pressure sensitive adhesives, which comprises the following steps:
 (a) compounding
  an acrylic hotmelt pressure sensitive adhesive containing at least one functional group X, having a solvent content of not more than 0.5% by weight and a molecular mass $M_W$ of from 100,000 to 2,000,000 g/mol,
  with at least one chemical substance R—Y containing at least one functional group Y, said at least one functional group X and said at least one functional group Y being chosen such that they are capable of undergoing a coupling reaction with one another,
 (b) treating the compound in a reactor with a mixing apparatus at a specific drive energy of not more than 0.09 kWh/kg and at a temperature of from 80 to 200° C.,
 (c) transferring the self-adhesive composition thus treated to a downstream coating unit, and applying it from the melt to a backing material.

The expression "preparing" is intended here to embrace functionalization and further processing of existing pressure sensitive adhesives to the desired end product.

The treatment of the compound in the reactor is carried out such that a coupling reaction takes place between said at least one functional group X of the acrylic hotmelt PSA and said at least one functional group Y of the added chemical substance. The chemical substance R—Y is preferably attached to the polymer molecules of the acrylic hotmelt PSA in such a way that the radicals R are subsequently in the form of sidechains of the polymer molecules.

In this context, the expression "coupling reaction" embraces, in particular, addition reactions and substitution reactions (especially esterification and transesterification reactions), with whole groups or moieties being able to be eliminated in the case of the substitution reactions. The process allows the introduction into the polymers of functional groups which are available for subsequent applications, for modifying the properties of the hotmelt PSA or for controlled follow-on reactions, such as efficient crosslinking under gentle conditions, without the functional groups being consumed or otherwise reacted, or losing their functionality, in the course of the polymerization process.

This makes it possible in an elegant way, by choosing different radicals R, to carry out targeted modification of the PSA as early as during the preparation process. For this purpose it is appropriate if the chemical substance R—Y contains, where appropriate, one or more further functional groups, Z, which contribute to the desired result for the self-adhesive composition.

As a result of introducing the chemical substance R—Y provided with at least one further functional group Z after polymerization has already taken place, these further functional groups Z retain their reactivity even following incorporation on the polymer chains. Functional groups which exhibit a high efficiency for the crosslinking reaction, for example, may be introduced into the polymers in this way, even if these functional groups would lose their functionality in the case of a radical polymerization.

The average molecular weights (weight averages, $M_w$) of the PSAs formed in the free radical polymerization are chosen such that they lie within a range which is customary for polyacrylic compositions, i.e., between 100,000 and 2,000,000; specifically for use as hotmelt PSAs, PSAs having average molecular weights (weight averages $M_w$) of from 100,000 to 800,000, more preferably from 100,000 to 400,000 g/mol are prepared. The polymerization may be conducted in the presence of an organic solvent, in the presence of water, or in mixtures of organic solvents and water. The aim is to minimize the amount of solvent used. Ideally, bulk polymerizations without additions of solvent are carried out. Depending on conversion and temperature, the polymerization time is between 6 and 48 hours. The higher the reaction temperature that can be chosen, i.e., the higher the thermal stability of the reaction mixture, the lower the reaction time.

A feature of one development of the inventive process is that the compounding step is preceded by a concentration process in the course of which the solvent content of the polyacrylic composition is reduced to a level of not more than the required 0.5% by weight. Particularly suitable for the concentration process are vented extruders, such as single-screw or twin-screw extruders, which in the case of the twin-screw extruder can be operated corotatingly or counterrotatingly.

It is particularly advantageous in the context of the invention to operate the process in such a way that the addition of the chemical substance R—Y and the treatment of the compound in a reactor with mixing device take place directly following the concentration step.

After the insertion of the already low-solvent PSA, or after the concentration operation, the chemical substance R—Y is added, preferably by metering. This takes place appropriately already in the same reactor used for subsequent or simultaneous implementation of the coupling reaction (extruder or co-kneader), preferably by metering. In another embodiment of the inventive process, the addition may also take place in another mixing device. Examples of devices suitable for this purpose are again twin-screw extruders, but also include ring extruders or any other mixing units familiar to the skilled worker.

In one very advantageous development of the invention, as already set out hereinabove, compounding and treatment (reaction) take place in the same reactor, advantageously in an extruder. This may be the extruder in which the concentration step has already been carried out.

Apparatus which has proven very suitable for the reaction includes a twin-screw extruder (e.g., Werner & Pfleiderer or Welding Engineers) or a co-kneader (e.g., Buss) (reactive extrusion). In the reactor, the optimum reaction conditions are adjusted by the length of the process section, the throughput (rotary speed), the kneading temperature, and the quantity of any catalysts used. Effective mixing of the reaction components allows the residence time in the reactor to be optimized. Moreover, the screw geometry of the extruder should be chosen to exert relatively low shearing, in order to prevent gelling in the process. It is of particular advantage for the inventive process if the specific drive energy of the reactor is less than 0.06 kWh/kg.

In accordance with the flow viscosity of the polyacrylate used, the reaction proceeds at elevated temperatures. The temperatures chosen are between 80 and 200° C.; in one particularly preferred range between 110 and 160° C.

For the process of the invention it may likewise be of advantage to vary the molecular weight in order to improve the melt processing properties. For example, by reducing the molecular weight, it is possible to lower the flow viscosity and thus increase the reactivity. Another point are the processing properties under shearing in an extruder, since PSAs of relatively low viscosity and molecular mass are easier to process in the extruder and, accordingly, the shearing introduced is greatly reduced.

For the inventive process overall it is of advantage to choose a continuous process regime and/or to operate individual steps thereof in an inline process. However, the batchwise process regime is also possible.

Coating of the self-adhesive composition onto the backing material takes place gel-free ("gel-free" denotes compliance with the requirements for coatability of the compositions using the coating apparatus which is commonly used and is familiar to the skilled worker for these purposes). A preferred procedure here is one in which the residence time between the reaction (treatment in the reactor) and coating is not more than 10 minutes. For the coating operation it is preferred to use melt nozzles or extrusion dies having a gap width of from 100 to 500 µm, more preferably from 150 to 300 µm. Backing materials which can be used here include those customary and familiar to the skilled worker, such as films, (polyester, PET, PE, PP, BOPP, PVC), nonwovens, foams, woven fabrics, and woven films, and also release paper where appropriate (Glassine, HDPE, LDPE, for example). This listing is not intended to be conclusive.

Coating onto the backing material is followed advantageously by crosslinking of the functionalized polyacrylic hotmelt PSA. Crosslinking of the PSA is preferably carried out by treatment with actinic radiation, although it may also be crosslinked chemically. Crosslinking of the hotmelt PSAs of the invention takes place advantageously by brief UV irradiation in the range from 200 to 400 nm using commercial high or medium pressure mercury lamps with an output of, for example, from 80 to 240 W/cm or by thermal crosslinking in a temperature range between 70 and 160° C. or else by ionizing radiation, such as by electron beam curing, for example. For UV crosslinking it may be appropriate to adapt the emitter output to the belt speed or to carry out partial shading of the belt, with slow running, in order to reduce its thermal loading. The irradiation time is governed by the construction and output of the respective emitters.

Residual monomers which have not been reacted in the hotmelt process or in the reactive extrusion, or other compounds containing polymerizable double bonds, may be reacted in the course of crosslinking with the radicals formed in the course of crosslinking and in that case are attached to the polymer, so that they are unable to escape from the PSA tape at a later point in time.

The coupling reactions between the functional groups X of the acrylic hotmelt PSA and the functional groups Y of the chemical substance R—Y may in particular represent both addition reactions and substitution reactions.

The following reactions are highlighted in this context; however, the list is not conclusive and is merely intended to serve as an illustration of the inventive process with reference to a number of exemplary coupling reactions:

| Group X- on polymer side | Group Y- in chemical substance R—Y | Type of reaction |
| --- | --- | --- |
| Anhydride- | Hydroxyl-, alkoxy-, mercapto-, thioether-, isocyanate-, amino-, oxazole-, etc. | Addition |
| Acid- | Hydroxyl- | Transesterification and esterification (substitution) |
| Ester- | Amino- | |
| Hydroxyl- | Isocyanate- | Addition |
| Acid- | | |

In one procedure which is very advantageous for the inventive process, carboxylic anhydride groups are used as functional groups X; this may also be mixed anhydrides. In this context it is possible to use, for example, polyacrylates with outstanding effect as acrylic hotmelt PSAs, these polyacrylates being preparable from the following monomer composition:

acrylic and methacrylic acid monomers of the following structure

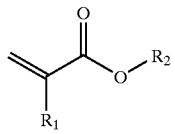

where $R_1$ = H or $CH_3$ and
$R_2$ = an alkyl chain with 2–20 carbon atoms
with a fraction of 45–99.5% by weight in the monomer mixture, one or more carboxylic anhydrides containing olefinic double bonds, with a fraction of 0.5–25% by weight in the monomer mixture, more preferably with a fraction of 1–5% by weight in the monomer mixture.

In addition, any olefinically unsaturated monomers which are known as copolymers for acrylic PSAs may be added to the monomer mixture. Reference may be made here to the prior art familiar to the skilled worker, such as Donatas SATAS, "Handbook of Pressure Sensitive Adhesive Technology", van Nostrand, New York 1989.

The selection of the chemical substance R—Y is guided by the chemical nature of the coupling reaction in respect of the functional group Y and by the desired modifications of the PSA in respect of the radical R. It is also possible to use two or more different chemical substances R—Y, chosen independently of one another.

Where the chosen group X of the acrylic hotmelt PSA is a carboxylic anhydride group, it is possible with advantage in the inventive context to use those substances R—Y which contain functional groups Y which are able to react directly or under catalysis with the carboxylic anhydride, especially in a linking reaction and/or in a polymer-analogous reaction.

The functional group Y may in particular be a hydroxyl function; hydroxy-terminated compounds are suitable with preference. Further suitable functional groups that may be mentioned here by way of example, without wishing to be unnecessarily restricted by such a listing, include the following:

alkoxy groups, mercapto groups, thioether groups, isocyanate groups, unsubstituted and substituted amino groups, oxazole and its derivatives, and/or unsubstituted or substituted amido groups, and also all other functional groups which react with carboxylic anhydrides in the sense outlined above.

The molar fraction of the added chemical substance R—Y advantageously corresponds to the molar amount of the functional groups X copolymerized into the polyacrylate chain (for example, the carboxylic anhydrides), but may also be chosen to be smaller or larger than said amount.

The molar amount of the chemical substance R—Y is very preferably chosen such that the molar ratio of the number $n_Y$ of functional groups Y of the chemical substance R—Y to the number $n_X$ of the copolymerized functional groups X (especially carboxylic anhydride units), $n_Y/n_X$ is in a range between 0.8 and 1.2, very preferably between 0.8 and 1; i.e., $n_Y/n_X \leq 1$. In the case of sluggish reactions, it is advantageous to use the chemical substance R—Y in amounts such that the functional groups X are in an excess over the functional groups Y in order to ensure as extensive a degree of reaction of the compound R—Y as possible. In this case it may be advantageous to choose $n_Y/n_X$ such that it is very much lower then 1.

Attention is drawn at this point to the fact that, where not set out especially below, the groups defined above as Y may also be present as groups X of the hotmelt PSA and the functional groups defined above as X in that case serve, accordingly, as groups Y of the chemical substance R—Y. The remarks made above then apply conversely.

In the text below, a number of examples are given of classes of compound which can be used with outstanding effect as chemical substances R—Y for the inventive process and which lead to preferred acrylic hotmelt PSAs. Substances used advantageously may be assigned to two or more of the types of chemical compound specified below, or other types.

In order to ensure effective and efficient crosslinking of the polymers, vinyl groups are used outstandingly, or more preferably acrylate or methacrylate groups, as chemical substances R—Y, also in the form of their substituted derivatives.

Accordingly, it is advantageous in the sense of the concept of the invention to use hydroxyl-containing acrylates, such as, very preferably, for example, 2-hydroxyethyl acrylate (2-HEA), 3-hydroxypropyl acrylate and hydroxyl-containing methacrylates, such as 2-hydroxyethyl methacrylate (2-HEMA), 3-hydroxypropyl methacrylate, and/or vinyl compounds, such as 1-decenol, for example, oxazolines, such as ricinene-alkyloxazoline or soya-alkyloxazoline, for example, acrylamides, such as butoxymethylacrylamide, for example, or substituted amino compounds, such as tert-butylaminoethyl methacrylate, for example.

Another advantageous embodiment of the inventive process uses oligomers or polymers as chemical substances R—Y, possessing a static glass transition temperature of not more than 0° C. The molecular weight $M_W$ of these compounds is advantageously between 1,000 and 30,000 g/mol, very preferably between 1,000 and 15,000 g/mol.

Particular preference is given here to using ethylene/butylene or ethylene/propylene copolymers As chemical substances R—Y it is also possible, in a favorable procedure, to use polymers whose static glass transition temperature is at least 50° C. Here again the molecule weight $M_W$ is preferably in a range from 1,000 to 30,000 g/mol, very preferably between 1,000 and 15,000 g/mol. In this case, mention may be made of polystyrene or polymethyl methacrylate. for example.

In another very advantageous variant of the inventive process, the chemical substances R—Y used comprise functionalized oligo- or poly(alkenyl glycol) monoalkyl ethers. These are preferably compounds of the general chemical formula

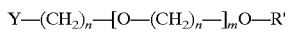

$$Y-(CH_2)_n-[O-(CH_2)_n-]_mO-R'$$

where Y is as already defined, $n \geq 1$ and $m \geq 2$ and R' represents an aliphatic hydrocarbon radical containing at least one carbon atom.

Particularly preferred examples here are poly(ethylene glycol) monomethyl ether, poly(ethylene glycol) monobutyl ether, poly(propylene glycol) monobutyl ether, and poly(propylene glycol) monoethyl ether. Use may also be made, however, of mixtures of different poly(alkenyl glycol) monoalkyl ethers, and also block copolymers which are known to the skilled worker and have a corresponding structure, such as poly(propylene glycol)-block-poly(ethylene glycol) monoalkenyl ethers.

In a corresponding way, photoinitiator molecules can be installed in polyacrylate hotmelt PSAs by the inventive process if the photoiniators are modified beforehand with a group Y as set out hereinabove.

In one procedure which is very advantageous for the process, catalysts are added in order to raise the reactivity. The fraction of the catalyst is between 0.01 and 5 mol %, but preferably between 0.1 and 0.5 mol %, based on the molar fraction of the functional groups X in the hotmelt PSA (before the coupling reaction).

The reaction proceeds with particular preference under acid or base catalysis. Acids which can be used include all Lewis acid compounds. The reaction proceeds preferentially with p-toluenesulfonic acid, itaconic acid, dibutyltin oxide or with sodium acetate. Bases which can be used include all Lewis bases. The reaction takes place preferentially under catalysis by 4-vinylaniline.

Compounding, i.e., the addition of further additives, may generally be carried out likewise in the same apparatus as the preceding steps, in a further extruder, or in a compounder; additional mixing of the polymer mass may also take place here.

In order to produce the adhesive tapes the polymers described above are optionally blended with crosslinkers. Suitable crosslinker substances in this sense are difunctional or polyfunctional acrylates, difunctional or polyfunctional isocyanates, or difunctional or polyfunctional epoxides. It is also possible here, however, to use any further difunctional or polyfunctional compounds which are familiar to the skilled worker and are capable of crosslinking polyacrylates.

For crosslinking with ultraviolet radiation, photoinitiators are used. Without wishing to be restricted unnecessarily, examples of photoinitiators include cleaving photoinitiators (photoiniators which form free radicals), especially α-cleavers, and hydrogen abstractors. The group of the photo-cleaving initiators includes, for example, aromatic carbonyl compounds, especially benzoin derivatives, benzil ketals, and acetophenone derivatives. The hydrogen abstractors include, for example, aromatic ketones, such as benzophenone, benzil, and thioxanthones.

For producing PSAs these elastomers are further blended optionally with at least one resin. Tackifying resins to be added include without exception all tackifier resins which are known and are described in the literature. As representatives of such resins mention may be made of the pinene resins, indene resins and rosins, their disproportionated, hydrogenated, polymerized, and esterified derivatives and salts, the aliphatic and aromatic hydrocarbon resins, terpene resins and terpene-phenolic resins, and also C5-, C9-, and other hydrocarbon resins. Any desired combinations of these and further resins may be used in order to adjust the properties of the resulting adhesive in accordance with what is required. In general, any resins which are compatible (soluble) with the corresponding polyacrylate may be used. Express reference is made to the depiction of the state of the art in the "Handbook of Pressure Sensitive Adhesive Technology" by Donatas Satas (van Nostrand, 1989).

The acrylic hotmelts may further be blended with one or more additives such as aging inhibitors, light stabilizers, ozone protectants, fatty acids, resins, plasticizers, nucleators, blowing agents, and accelerators. As aging inhibitors it is possible to use both primary and secondary aging inhibitors and also light stabilizers, and combinations thereof with one another. Reference will merely be made at this point to the appropriate Irganox™ products from Ciba Geigy or Hostanox™ from Clariant. Further outstanding antiaging agents which can be used include phenothiazine (C radical scavenger) and also hydroquinone methyl ether in the presence of oxygen, and oxygen itself.

The hotmelt PSAs may further be filled with one or more fillers such as fibers, carbon black, zinc oxide, titanium dioxide, solid microbeads, hollow or solid glass beads, silica, silicates, and chalk, with the addition of blocking-free isocyanates also being possible.

The invention also provides for the use of a polyacrylic hotmelt PSA, functionalized as described above, for an adhesive tape, said polyacrylic hotmelt PSA being applied to one or both sides of a backing.

EXAMPLES

The examples set out below are intended to illustrate the inventive process without wishing to subject it to any unnecessary restriction as a result.

Test Methods
Gel Permeation Chromatography (Test A)

The average molecular weight $M_W$ and the polydispersity PD were determined by the company Polymer Standards Service in Mainz, Germany. The eluent used was THF containing 0.1% by volume trifluoroacetic acid. Measurement was made at 25° C. The precolumn used was PSS-SDV, 5μ, $10^3$ Å, ID 8.0 mm×50 mm. For separation, the columns used were PSS-SDV, 5μ, $10^3$ and also $10^5$ and $10^6$ each of ID 8.0 mm×300 mm. The sample concentration was 4 g/l, the flow rate 1.0 ml per minute. Measurement was made against PMMA or polystyrene standards.

Determination of the Gel Fraction (Test B)

The carefully dried, solvent-free samples of adhesive are welded into a pouch of polyethylene nonwoven (Tyvek nonwoven). From the difference in the sample weights before and after extraction with toluene, the gel index is found as the percentage weight fraction of the polymer that is insoluble in toluene.

IR Spectroscopy (Test C)

Measurement was carried out using the FT-IR IFS 45 spectrometer from Bruker. First of all, a calibration plot was constructed using different concentrations of the individual carboxylic anhydrides. To determine the conversion of the corresponding fractions of carboxylic anhydrides, the percentage fall in the CO band was measured.

Polystyrene P-1:

A 1 L three-necked flask equipped with septum, a condenser, a thermometer, an argon inlet tube, and a magnetic stirrer was charged with 800 ml of pure, dry cyclohexane (Aldrich; 99.5% anhydrous). 50 ml of cyclohexane was distilled off under a stream of argon, with heating. The styrene used (Aldrich, 99+%) was filtered over 70 mesh silica gel under argon, and then 33 ml of this styrene were transferred into the three-necked flask through the septum using a stainless steel syringe. sec-Butyllithium (1.4 molar, Aldrich) was added dropwise to the cyclohexane/styrene mixture until a pale yellow color was established. The temperature of the reaction solution remained below 50° C. Thereafter, 4.25 ml of sec-butyllithium (1.4 molar, Aldrich) were added rapidly through the septum using a syringe. The rapidly ensuing reaction was controlled by maintaining the temperature of the reaction solution at 65° C. The polymerization was over after an hour and the reaction solution cooled to 35° C. The orange/yellow polystyrenelithium was then scavenged cold with an excess of ethylene oxide and subsequently hydrolyzed with 0.5 N aqueous HCl solution. The polymer was then slowly precipitated from methanol and freed from the solvent overnight in a vacuum drying oven. Test A gave an average molecular weight ($M_W$) of 4100 g/mol for the polymer, with a polydispersity, PD, of 1.20.

Example 1

A reactor conventional for radical polymerizations was charged with 8 kg of acrylic acid, 48 kg of NTBAM, 8 kg of maleic anhydride, 368 kg of 2-ethylhexyl acrylate, 368 kg of n-butyl acrylate, and 600 kg of acetone/isopropanol (97:3). Nitrogen gas was passed through the reactor for 45 minutes with stirring, after which the reactor was heated to 58° C. and 400 g of Vazo 67™ (DuPont) were added; Vazo 67™ is 2,2'-azobis(2-ethylpropionitrile). The external heating bath was then heated to 75° C. and the reaction was carried out constantly at this external temperature. After a reaction time of 1 h, a further 400 g of Vazo 67™ (DuPont) were added. The reaction was terminated after 48 h and the product was cooled to room temperature and tested by test method A. The average molecular weight $M_W$ was 785,000 g/mol.

Example 2

The adhesive from Example 1 was freed from the solvent in a concentrating extruder (W&P ZSK 58, L=40 D). The vacuum of the backward devolatilization was 250 mbar, with the 3 vacuum states operated at 300, 250, and 6 mbar. The entry temperature of the polymer solution was 110° C. The rotary speed was set at 185 revolutions per minute, so that the extruder was operated with a specific drive energy of 0.12 kWh/kg. The throughput, correspondingly at 110 kg/h feed solution, was 51 kg/h concentrate. 117° C. were measured as the exit temperature.

Example 3

The acrylic hotmelt from Example 2 was transferred to a second twin-screw extruder from Welding Engineers (30 mm D.W.D.). The entry temperature of the acrylic hotmelt was 115° C. In the Welding extruder the concentrate was compounded with 0.82 kg/h hydroxypropyl acrylate. The extruder was operated with a rotary speed of 400 revolutions per minute and a specific drive energy of 0.018 kWh/kg. The overall throughput was 40 kg/h. The exit temperature was 145° C. Test method C was conducted for the purpose of analysis. The conversion according to IR was more than 90%.

The acrylic hotmelt was then conveyed to a slot die and was subsequently applied at a temperature of 135° C. and a rate of 50 g/m² to a Saran-primed PET film 23 µm thick. After the coating had been irradiated, the gel index was determined in accordance with test method B, and found to be 0.

Example 4

The acrylic hotmelt from Example 2 was transferred to a second twin-screw extruder from Welding Engineers (30 mm D.W.D.). The entry temperature of the acrylic hotmelt was 115° C. In the Welding extruder the concentrate was compounded with 4 kg/h polystyrene P-1. The extruder was operated with a rotary speed of 200 revolutions per minute and a specific drive energy of 0.009 kWh/kg. The overall throughput was 20 kg/h. The exit temperature was 155° C. The residence time was raised to 4 min at 160° C. by means of a downstream pipeline system. Test method C was conducted for the purpose of analysis. The conversion according to IR was 58%.

The acrylic hotmelt was then conveyed to a slot die and was subsequently applied at a temperature of 185° C. and a rate of 50 g/m² to a Saran-primed PET film 23 µm thick. After the coating had been irradiated, the gel index was determined in accordance with test method B, and found to be 0.

Example 5

The acrylic hotmelt from Example 2 was transferred to a second twin-screw extruder from Welding Engineers (30 mm D.W.D.). The entry temperature of the acrylic hotmelt was 115° C. In the Welding extruder the concentrate was compounded with 0.75 kg/h poly(ethylene glycol) butyl ether ($M_n$=350). The extruder was operated with a rotary speed of 200 revolutions per minute and a specific drive energy of 0.009 kWh/kg. The overall throughput was 20 kg/h. The exit temperature was 155° C. The residence time was raised to 4 min at 165° C. by means of a downstream pipeline system. Test method C was conducted for the purpose of analysis. The conversion according to IR was 47%. The acrylic hotmelt was then conveyed to a slot die and was subsequently applied at a temperature of 135° C. and a rate of 50 g/m² to a Saran-primed PET film 23 µm thick. After the coating had been irradiated, the gel index was determined in accordance with test method B, and found to be 0.

Example 6

The acrylic hotmelt from Example 2 was transferred to a second twin-screw extruder from Welding Engineers (30 mm D.W.D.). The entry temperature of the acrylic hotmelt was 115° C. In the Welding extruder the concentrate was compounded with 0.484 kg/h octadecanol. The extruder was operated with a rotary speed of 200 revolutions per minute and a specific drive energy of 0.009 kWh/kg. The overall throughput was 20 kg/h. The exit temperature was 157° C. The residence time was raised to 4 min at 165° C. by means of a downstream pipeline system. Test method C was conducted for the purpose of analysis. The conversion according to IR was 65%.

The acrylic hotmelt was then conveyed to a slot die and was subsequently applied at a temperature of 135° C. and a rate of 50 g/m² to a Saran-primed PET film 23 µm thick. After the coating had been irradiated, the gel index was determined in accordance with test method B, and found to be 0.

The process of the invention opens up the application of reactive extrusion in the preparation and functionalization of polyacrylate-based pressure sensitive adhesives. This result is surprising and was unforeseeable for the skilled worker. It was not to have been expected that reactions with low activation energies would lead to gel-free products. On the contrary, the skilled worker would have expected the very drastic process conditions (high temperatures, long residence times), which are typical of reactive extrusion, to lead to a high level of gelling in the extruder.

The polyacrylates prepared in the process of the invention have had carboxylic anhydride groups, carboxylic acid groups, hydroxyl groups or the like installed in them; additionally, (meth)acrylate groups or, where appropriate, other reactive radicals are present as sidechains. Under the conditions of the reactive extrusion the expectation would have been that there would be secondary reactions, in the form of transesterification reactions, for example, especially those of the polymer chains. Secondary reactions of this kind would have resulted in a high level of gelling of the polyacrylate composition. Contrary to expectation, virtually no such reactions were observed; instead, a reaction takes place preferentially, in accordance with the invention, between the functional groups X of the polymer chains (preferably carboxylic acid groups, especially maleic anhydride groups) and the functional groups Y of the added monomers (preferably hydroxyl groups). This surprisingly allows polymer-analogous reactions to be carried out in the extruder, which owing to the high reaction rates lead to low residence times in the extruder.

It is possible here to prepare gel-free polyacrylate compositions possessing high stability with regard to a gelling process ("gel-free" means compliance with the requirements for the compositions to be applicable using the coating apparatus commonly employed). Because of the freedom from gel, the polyacrylate compositions can be used for adhesives which can be applied from the melt, and can therefore be used as pressure sensitive adhesives for PSA tapes, for example. The coatability is characterized by a uniform (homogeneous) coating pattern, with no inhomogeneities, when coating takes place through the dies commonly used (melt nozzles or extrusion dies with a gap width of from 100 to 500 μm, more preferably from 150 to 300 μm), to polyester backings 50 μm thick, for example. The polyacrylate compositions commonly prepared in reactive extrusion processes do not meet these requirements and cannot be used as PSAs.

Through the choice of the radicals R in the chemical substances R—Y it is possible to modify the properties of the hotmelt PSAs. Accordingly it is possible to prepare adhesives specifically for certain applications and, as described above, to apply said adhesives in gel-free form. The inventive process therefore represents a possibility for elegantly providing a broad palette of adhesive tapes with polyacrylate PSAs for a broad field of application.

Thus, for example, the process of the invention provides for incorporation of (meth)acrylate groups into the sidechains of polyacrylates in hotmelt systems. This offers the advantage of very gentle crosslinking methods, since crosslinking can be carried out directly by way of the installed acrylate groups. Where crosslinking is carried out using electron beams, the crosslinking reaction rate is very high and the conversion of the acrylate groups is high. Accordingly, polyacrylic PSAs prepared and crosslinked by the inventive process possess very little, if any, potential for postcrosslinking.

As compared with non-functionalized polyacrylates, the dose required for optimum crosslinking can be lowered, so reducing the energy requirements and, in the case of electron beam crosslinking, causing less damage to the backing material. Additionally, a cohesion-increasing effect has been found.

When using chemical substances R—Y having glass transition temperatures of at least 50° C., such as hydroxy-terminated polystyrene or PMMA, for example, acrylic hotmelt PSAs can be prepared which are capable of forming domains.

The use of macromolecular or polymeric chemical substances R—Y with glass transition temperatures of not more than 0° C.—selected examples include hydroxy-terminated polyethylene/butylene copolymers or long-chain aliphatic alcohols—leads to a reduction in the polarity of the PSAs.

The use of oligo- or poly(alkenyl glycol) monoalkyl ethers leads in turn to hotmelt PSAs which can be applied in gel-free form and which owing to reactive extrusion are functionalized with glycol units along the polymer chain.

The inventive process therefore affords great flexibility in terms of the properties of the hotmelt PSAs; it is therefore possible to produce adhesive tapes equipped with advantageously prepared PSAs for a broad field of application.

We claim:

1. A process for preparing polyacrylic hotmelt pressure sensitive adhesives having functional groups R, which comprises the following steps:
    (a) compounding
        an acrylic hotmelt pressure sensitive adhesive containing at least one functional group X, having a solvent content of not more than 0.5% by weight and a weight average molecular weight $M_W$ of from 100,000 to 2,000,000 g/mol,
        with at least one chemical substance R—Y containing at least one functional group Y,
        said at least one functional group X and said at least one functional group Y being chosen such that they are capable of undergoing a coupling reaction with one another,
    (b) reacting the compounded product at a temperature of from 80 to 200° C. in a reactor with a mixing apparatus operating at a specific drive energy of not more than 0.09 kWh/kg and,
    (c) transferring the reaction product to a coating unit, and applying it as a melt to a backing material.

2. The process as claimed in claim 1, wherein
    said compounding is preceded by a process of concentrating the acrylic hotmelt adhesive.

3. The process as claimed in claim 1, wherein
    said compounding and said reaction are conducted in the same reactor.

4. The process as claimed in claim 1, wherein
    said reactor is an extruder, a recording kneader or a compounder.

5. The process as claimed in claim 1, wherein
    the specific drive energy of the reactor is less than 0.06 kWh/kg.

6. The process as claimed in claim 1, wherein
    the time between reaction and coating is not more than 10 minutes.

7. The process as claimed in claim 1, wherein said process is a continuous process.

8. The process as claimed in claim 1, wherein
    following application to the backing material the reaction product is crosslinked by means of high-energy radiation.

9. The process as claimed in claim 1, wherein said functional group X is a carboxylic anhydride group.

10. The process as claimed in claim 1, wherein said functional group Y is a member of the group consisting of hydroxyl, alkoxy, mercapto, thioether, amino, amido and oxazoline.

11. The process as claimed in claim 1, wherein the molar ratio $n_Y n_X$ of the number $n_Y$ of the functional groups Y to the number $n_X$ of the functional groups X is between 0.8 and 1.2.

12. The process as claimed in claim 1, wherein said at least one chemical substance R—Y is a compound containing vinyl groups, (meth)acrylate groups or both.

13. The process as claimed in claim 1, wherein said one or more chemical substance R—Y comprises one or more chemical substances which have a static glass transition temperature of not more than 0° C.

14. The process as claimed in claim 1, wherein said at least one chemical substance R-Y comprises one or more chemical substances which have a static glass transition temperature of at least 50° C.

15. The process as claimed in claim 1, wherein said one or more chemical substances R—Y comprises one or more chemical substances which have a weight average molecular weight $M_W$ in the range of from 1,000 to 30,000 g/mol.

16. The process as claimed in claim 1, wherein said one or more chemical substance R—Y are selected from the group consisting of functionalized oligo- and poly(alkenyl glycol) monoalkyl ethers.

17. The process as claimed in claim 1, wherein said one or more chemical substances R—Y are selected from one of the following groups:

2-hydroxyethyl acrylate, 2-hydroxyethyl methacrylate, hydroxypropyl acrylate, hydroxypropyl methacrylate, 1-decenol, ricinene-alkyloxazoline, soya-alkyloxazoline, butoxymethylacrylamide, tert-butylaminoethyl methacrylate, ethylene/butylene copolymers, ethylene/propylene copolymers, polystyrene, polymethyl methacrylate, poly(ethylene glycol) monomethyl ether, poly(ethylene glycol) monobutyl ether, poly(propylene glycol) monobutyl ether, poly(propylene glycol) monomethyl ether block copolymers, preferably poly(propylene glycol)-block-poly(ethylene glycol) monoalkenyl ethers.

18. The process as claimed in claim 1, wherein catalysts, resins, crosslinkers or other additives, or a combination thereof, are added to the adhesive in the course of the process.

19. An adhesive tape comprising a polyacrylic hotmelt pressure-sensitive adhesive prepared by the process of claim 1, applied to one or both sides of a backing.

20. The process of claim 11, wherein said ratio is between 0.8 and 1.

* * * * *